(12) United States Patent
Riedel et al.

(10) Patent No.: US 7,584,992 B2
(45) Date of Patent: Sep. 8, 2009

(54) OCCUPANT PROTECTION DEVICE

(75) Inventors: Andreas Riedel, Illertissen (DE); Georg Rasch, Biebertal-Bühl (DE); Hans-Peter Sendelbach, Senden (DE); Christian Weyrich, Neu-Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 487 days.

(21) Appl. No.: 11/311,125

(22) Filed: Dec. 20, 2005

(65) Prior Publication Data

US 2006/0138757 A1 Jun. 29, 2006

(30) Foreign Application Priority Data

Dec. 24, 2004 (DE) .................. 10 2004 063 268

(51) Int. Cl.
*B60R 21/26* (2006.01)
(52) U.S. Cl. .................. 280/736; 280/741; 280/733
(58) Field of Classification Search ................ 280/733, 280/736, 740, 730.2, 741
See application file for complete search history.

(56) References Cited

U.S. PATENT DOCUMENTS

| | | | | |
|---|---|---|---|---|
| 3,724,870 | A | * | 4/1973 | Kurokawa et al. .......... 280/741 |
| 5,404,263 | A | * | 4/1995 | Graves et al. ............... 361/247 |
| 5,642,903 | A | | 7/1997 | Headley |
| 5,871,230 | A | | 2/1999 | Lewis |
| 6,196,575 | B1 | | 3/2001 | Ellerbrok et al. |
| 6,273,462 | B1 | | 8/2001 | Faigle et al. |
| 6,293,582 | B1 | * | 9/2001 | Lewis ........................ 280/735 |
| 2002/0089156 | A1 | * | 7/2002 | Swann et al. ................ 280/735 |
| 2003/0006594 | A1 | * | 1/2003 | Bergerson et al. .......... 280/736 |
| 2003/0038463 | A1 | * | 2/2003 | Stonich et al. .............. 280/733 |
| 2003/0141709 | A1 | * | 7/2003 | Honda et al. ............. 280/730.2 |
| 2004/0201208 | A1 | * | 10/2004 | Longhurst et al. .......... 280/741 |

FOREIGN PATENT DOCUMENTS

WO WO 97/47498 12/1997
WO WO 2004/091982 A1 10/2004

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

An occupant protection device for protecting a vehicle occupant in the event of a vehicle accident, with a gas generator and an airbag which is connected to the gas generator and is inflated by the gas generator in the event of an accident. The gas generator includes a combustion chamber with propellant material which is ignited by a releasable igniting charge, and both the gas formed during combustion of the igniting charge and the gas formed during combustion of the propellant material being used for filling the airbag.

34 Claims, 3 Drawing Sheets

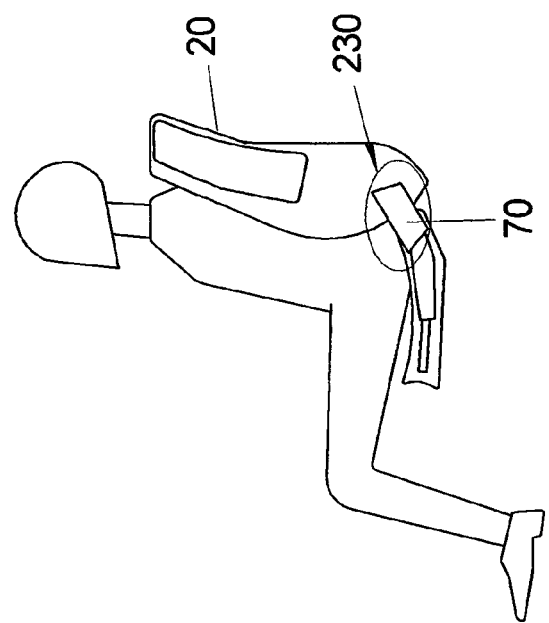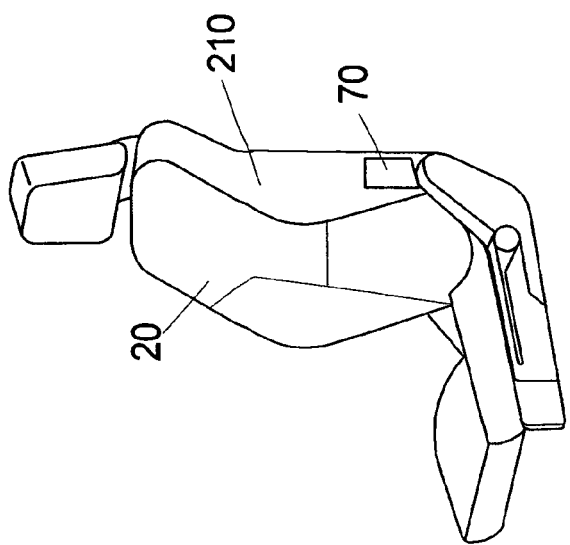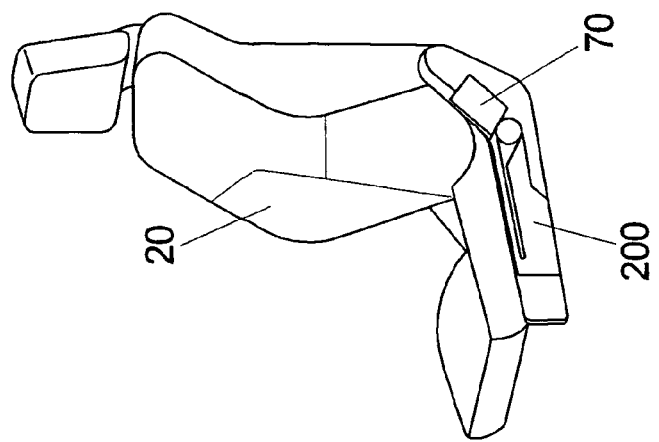

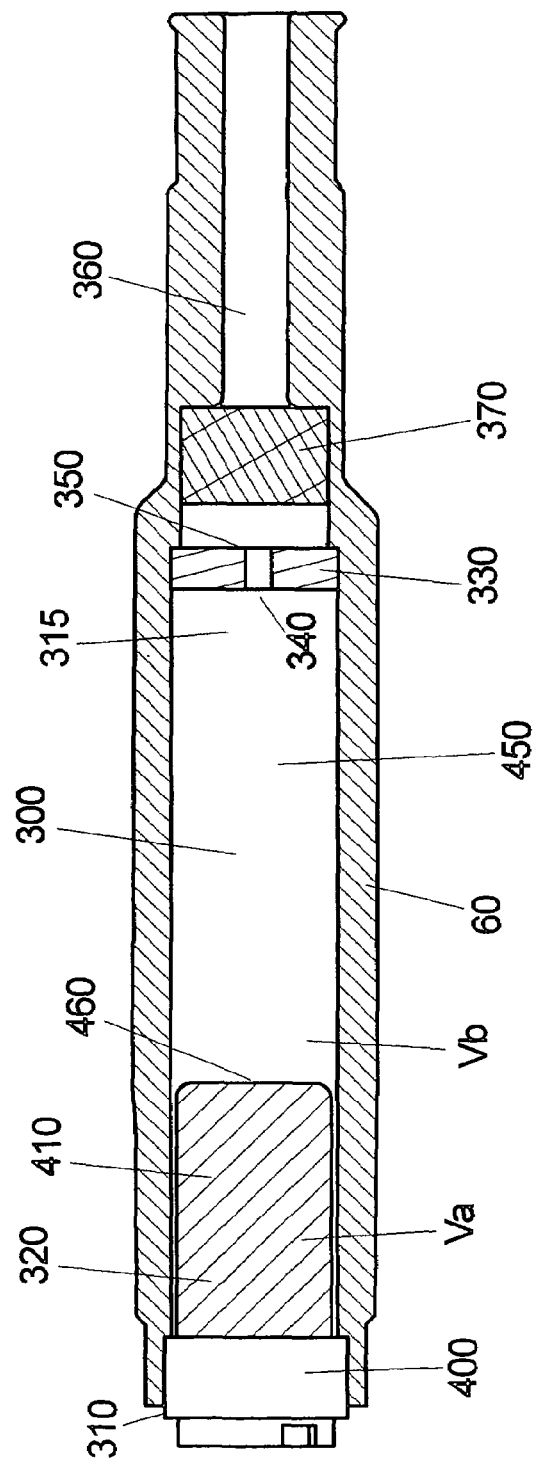
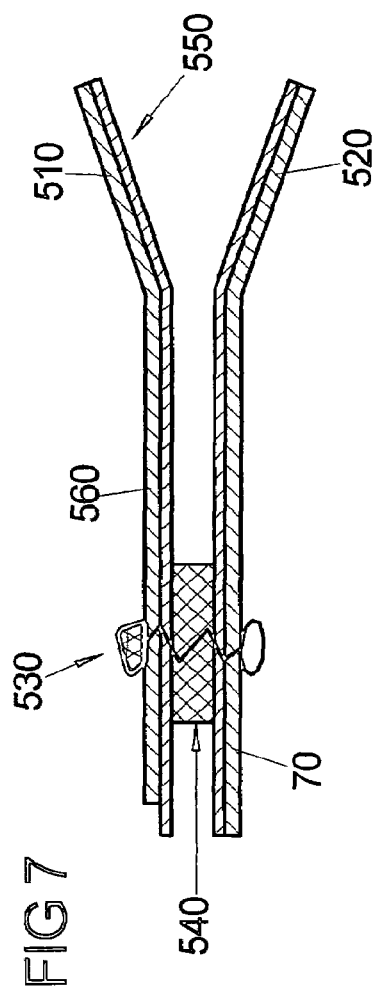

US 7,584,992 B2

OCCUPANT PROTECTION DEVICE

BACKGROUND

An occupant protection device is known from the international patent application WO 2004/091982 A1 (which is hereby incorporated by reference herein in its entirety). This previously known occupant protection device has a gas generator and an airbag which is connected to the gas generator and is inflated by the gas generator in the event of an accident. The gas generator is equipped with a tubular combustion chamber with propellant material which is ignited by a releasable igniting charge which belongs to an "igniter" placed on one tube end of the combustion chamber in a gastight manner. Both the gas formed during combustion of the igniting charge and the gas formed during combustion of the propellant material are used for filling the airbag. In the combustion chamber there is a cylindrical gas-conducting device which first of all conducts the gas generated by the igniting charge to the propellant material; the gas is therefore prevented from immediately leaving the combustion chamber. The gas of the igniting charge therefore first of all ignites the propellant material before it can pass together with the gas of the propellant material to the combustion chamber outlet. The combustion chamber outlet is formed by a throttle element arranged at the other tube end of the tubular combustion chamber.

SUMMARY

One embodiment of the invention relates to an occupant protection device for protecting a vehicle occupant in the event of a vehicle accident. The device comprises a gas generator including a combustion chamber and a releasable igniting charge, there is no propellant material in the combustion chamber and an airbag connected to the gas generator and inflated by the gas generator in the event of an accident. Only gas of the igniting charge is used for filling the airbag.

Another embodiment of the invention relates to an occupant protection device for protecting a vehicle occupant in the event of a vehicle accident. The device comprises a gas generator; and an airbag connected to the gas generator and inflated by the gas generator in the event of an accident. The gas generator includes a combustion chamber in which, in the event of an accident, a combustible material is combusted forming a gas which inflates the airbag. The combustion chamber is provided with a gas- or air-filled space in which the gas formed by the combustible material collects before it leaves the combustion chamber at a combustion chamber outlet. The volume of the gas- or air-filled space is larger than the volume of the combustible material.

Another embodiment of the invention relates to an occupant protection device for protecting a vehicle occupant in the event of a vehicle accident. The device comprises a gas generator including a tubular combustion chamber with first and second tube ends, the first tube end includes an electrically releasable igniter placed in a gastight manner and the second tube end includes a throttle element; and an airbag connected to the gas generator and inflated by the gas generator in the event of an accident. A space between the igniter and the throttle element is filled exclusively with gas or air.

Another embodiment of the invention relates to an occupant protection device for protecting a vehicle occupant in the event of a vehicle accident. The device comprises a gas generator including a tubular combustion chamber with first and second tube ends, the first tube end includes an electrically releasable igniter placed in a gastight manner and the second tube end includes a throttle element; and an airbag connected to the gas generator and inflated by the gas generator in the event of an accident. A space between the igniter and the throttle element is filled exclusively with gas or air and with at least one cooling element and/or filter element.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 shows a further exemplary embodiment for an occupant protection device according to the invention.

FIG. 4 shows a further exemplary embodiment for an occupant protection device according to the invention.

FIG. 5 shows a further exemplary embodiment for an occupant protection device according to the invention.

FIG. 6 shows an exemplary embodiment for a gas generator for the occupant protection devices according to FIGS. 1 to 5.

FIG. 7 shows an exemplary embodiment for an airbag for the occupant protection devices according to FIGS. 1 to 5.

DETAILED DESCRIPTION

Figure 1:
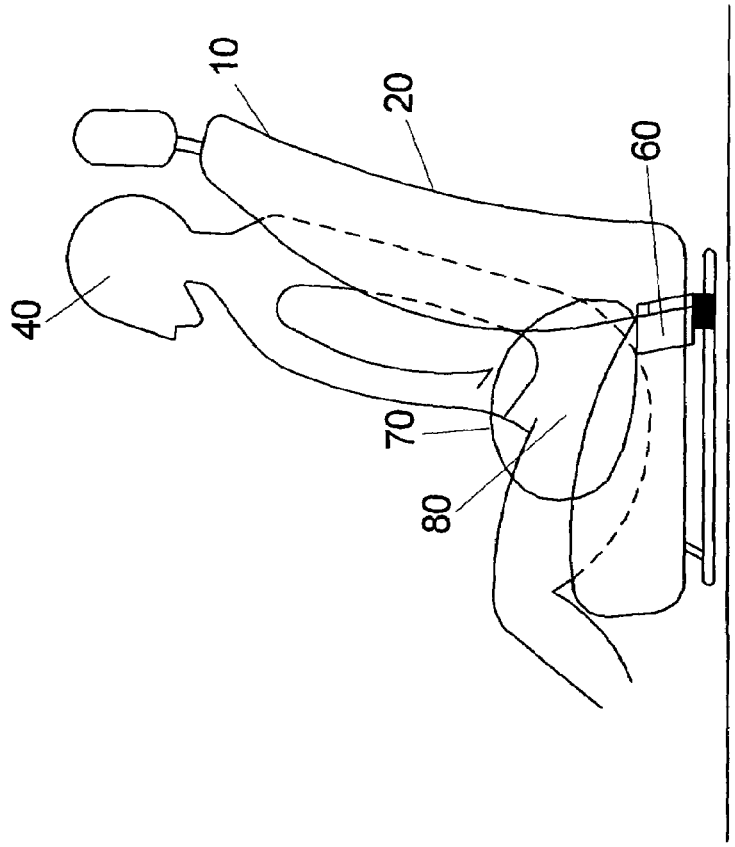
FIG. 1 shows a first exemplary embodiment for an occupant protection device according to the invention before an accident occurs.

An object of the invention includes improving an occupant protection device to the effect that this occupant protection device can be produced particularly simply and cost-effectively; nevertheless, a sufficient amount of filling gas suitable for filling the airbag is to be formed.

According to embodiments of the invention, no propellant material is in a combustion chamber and only gas of an igniting charge is used for filling an airbag.

According to embodiments of the invention, additional propellant material in the combustion chamber is therefore dispensed with, and only the gas formed by the igniting charge is used for producing gas for the airbag. By means of this measure, the construction of the gas generator is highly simplified, as a result of which significant cost savings are obtained. Although overall less gas is produced due to the absence of the additional propellant material, this is insignificant in practice if, for example, small airbags, in particular small, gastight airbags, are filled.

The igniting charge can be, according to an embodiment, ignited electrically and belongs, for example, to an electrically ignitable igniter.

For efficient formation of gas, it is regarded as advantageous if in the combustion chamber there is a gas- or air-filled space in which the gas formed by the igniting charge collects before it leaves the combustion chamber at a combustion chamber outlet. The gas- or air-filled space is under ambient pressure, for example; in the event of an "air filling", a hermetic sealing of the combustion chamber is not required. The gas- or air-filled space, which may be regarded as an "empty" space for the combustion operation and could therefore also be referred to as "empty" space, makes it possible for the chemical combustion operation to be ended before the gas is conducted further, for example to a filter device or cooling device of the gas generator.

A particularly good formation of gas is achieved in an advantageous manner if the gas- or air-filled ("empty") space is larger than the installation volume or the "material volume" of the igniting charge.

In order to achieve a reduction of the gas pressure at the combustion chamber outlet, the combustion chamber outlet may be formed by a throttle element, in particular a throttle disc with at least one through-hole.

Embodiments of the invention also relate to an occupant protection device for protecting a vehicle occupant in the event of a vehicle accident, that includes a gas generator and an airbag which is connected to the gas generator and is inflated by the gas generator in the event of an accident; the gas generator has a combustion chamber in which, in the event of an accident, a combustible material is combusted forming a gas which inflates the airbag. The combustion chamber is provided with a gas- or air-filled space in which the gas formed by the combustible material collects before it leaves the combustion chamber at a combustion chamber outlet.

Starting from this occupant protection device, provision is made, within the context of a second embodiment of the invention, for the volume of the gas- or air-filled space to be larger than the volume of the combustible material. As already mentioned, this measure results in a particularly good formation of gas.

The combustible material may be formed exclusively by an electrically ignitable igniting charge, in particular an electrically ignitable igniter.

Also in the case of the second embodiment of the invention, the combustion chamber outlet may have a throttle element, in particular a throttle disc with at least one through-hole.

Embodiments of the invention also relates to an occupant protection device with a gas generator and an airbag which is connected to the gas generator and is inflated by the gas generator in the event of an accident. The gas generator has a tubular combustion chamber and on one tube end an electrically releasable igniter is placed in a gastight manner and on the other tube end a throttle element is arranged.

In a third embodiment, the space between the igniter and the throttle element is to be filled exclusively with gas or air. As an alternative, within the context of a fourth embodiment of the invention, provision is made for the space between the igniter and the throttle element to be filled exclusively with gas or air and with a cooling element and/or filter element.

In another embodiment, in the event of an accident, the airbag is positioned in such a manner and is inflated by the gas generator to such a large gas pressure that at least the pelvis of the vehicle occupant is moved in the direction of the vehicle interior. As soon as the airbag which is deployed preferably at waist or pelvis height is inflated, it presses the vehicle occupant's pelvis into the interior of the vehicle. An effect therefore achieved in the event of a side impact is that the vehicle occupant is moved away from the door paneling and/or body paneling (e.g. the B-pillar) pushing or intruding into the vehicle interior. The intruding vehicle regions therefore-impact against the sensitive abdomen and thorax region of the vehicle occupant with a smaller differential speed than would otherwise be the case; this is because the relative distance covered by the intruding vehicle regions until they impact against the vehicle occupant is increased. The risk of injury is therefore reduced by the vehicle occupant moving away.

The airbag can be fastened, for example, in the outer wall region of the vehicle, in particular in the region of a motor vehicle door or a vehicle pillar or can be integrated therein. As an alternative, the airbag can be fastened in or to the vehicle seat, for example in or to the seat underframe, in or to the backrest frame or in/to the backrest pivot point of the vehicle seat or can be integrated therein. Fastening in or to a covering part of the vehicle seat is also possible.

According to another embodiment, provision is made for the airbag to be fastened in or to a belt end fitting for a seatbelt of the vehicle or to be integrated therein.

A further embodiment makes provision for the airbag to be fastened in or to a seatbelt of the occupant protection device or to be integrated therein. A possible advantage of this embodiment of the occupant protection device can be seen in the fact that it can be fitted in a particularly simple manner owing to the airbag being integrated with the seatbelt; this is because the installation does not require special installation measures being undertaken on the body or vehicle seat. Specifically, the occupant protection device according to the embodiment can therefore be fitted in any desired vehicle seats and in any desired vehicles by a corresponding belt system with an integrated airbag being fitted on the vehicle. Owing to the airbag being integrated with the seatbelt (belt strap), it is possible, in addition, also to provide conventional vehicles retrospectively with the occupant protection device according to embodiments of the invention. All that it is necessary is to replace the previously existing seatbelt system with the occupant protection device according to embodiments of the invention with an airbag integrated in the seatbelt. In addition, owing to the airbag being integrated in the seatbelt, a tensioning of the belt is additionally achieved: that is to say, as soon as the airbag is inflated in the pelvic region of the vehicle occupant and the vehicle occupant is moved in the direction of the vehicle interior, a tensioning of the belt is brought about at the same time and this securely holds the vehicle occupant in the vehicle seat. Moreover, in the case of the airbag being integrated in the belt strap, an optimum covering of the vehicle occupant's pelvis is always achieved irrespective of the particular position of the vehicle seat; this is because even if the position of the vehicle seat is adjusted, the airbag which is integrated with the belt strap is always moved correspondingly and is therefore inevitably always optimally positioned relative to the vehicle occupant's pelvis.

The airbag can be integrated in the seatbelt in a particularly simple and therefore advantageous manner if the seatbelt is of double-walled design and the airbag is placed in the interior of the double-walled seatbelt (or belt strap). In this case, the airbag may be folded up in the interior of the seatbelt or may extend in a tubular manner in the interior of the seatbelt.

As an alternative, the airbag may be fitted on the outside of the seatbelt: during the inflation, it is then guided by the seatbelt, preferably by one or more loops, sliding rings, eyelets or the like.

The airbag may be a pelvic airbag which completely covers the pelvic region of the vehicle occupant. By means of a complete covering of the pelvic region, it is possible that the vehicle occupant is pressed or moved into the vehicle interior as rapidly as possible and without a great risk of injury in the event of an accident.

In an embodiment, the airbag in the pelvic region of the vehicle occupant is arranged between the part of the pelvis which faces the vehicle outside and the vehicle outside. The part of the pelvis facing the vehicle interior is consequently not "affected" by the airbag and is also not covered by the latter.

In order, even in the case of physically large and heavy vehicle occupants, to ensure that the body is moved in the direction of the vehicle interior in the event of an accident, the gas generator is preferably designed so that it inflates the airbag to an internal pressure of at least 1.5 bar, preferably to an internal pressure of over 3 bar. The airbag material is correspondingly selected and processed so that it can build up corresponding working pressures without being damaged.

Moreover, the airbag may be integrated in the seatbelt so that it is deployed between the seatbelt and the pelvis of the vehicle occupant. By inflation in the region between the seatbelt and the vehicle occupant, a particularly effective tensioning of the seatbelt is achieved, so that—as already mentioned at the beginning—a dual protective effect is obtained: firstly, the vehicle occupant is pressed into the vehicle interior and, secondly, a tensioning of the seatbelt is achieved. In this case, the action of force for displacing the pelvis is applied by the seatbelt; the airbag does not need to be supported on other motor vehicle elements (for example inner outer wall of the vehicle).

As an alternative, the airbag can be integrated in the seatbelt so that it is deployed between the seatbelt and the inner surface of the outer wall of the vehicle—called "inner" vehicle outer wall in short below or just vehicle outer wall in short. The action of force for displacing the pelvis therefore has to be brought about by the airbag being supported on other motor vehicle elements (for example, outer wall of the vehicle).

According to another embodiment of the occupant protection device, provision is made for the woven fabric of the seatbelt to be elastic and for the airbag to be integrated in the seatbelt so that it widens or inflates the woven fabric of the seatbelt in the event of an accident. For this purpose, the airbag is preferably arranged in the interior of the woven fabric. During inflation, the airbag therefore extends in a tubular manner in the interior of the woven fabric of the seatbelt, with the result that the latter likewise becomes thicker in a tubular manner and is shortened in the process. The widening or inflation of the belt can take place concentrically, for example. The airbag is preferably integrated exclusively in the same region of the seatbelt which is assigned to the vehicle occupant's pelvic region which faces the outside of the vehicle.

In order to avoid a premature drop in pressure in the airbag, the latter preferably does not have an outflow opening.

The airbag may be of gastight design. For example, there is sealing material in the region of gas bag seams of the airbag in order to ensure the tightness of the airbag. In addition, the airbag can have silicone-coated woven material or can be made from such material in order to achieve the gas tightness.

The airbag may be accommodated in a module housing of metal or plastic. The module housing may be designed, for example, as a soft cover or as a hard shell and, in this case, a visible or invisible installation may be selected.

A module covering of the module housing may have, for example, a tear seam or a material weakening, in particular a flap with a film hinge, in order to facilitate and therefore to accelerate a deployment of the airbag.

In order to filter and/or cool the gases formed in the combustion chamber, at least one filter element and/or cooling element is preferably arranged between at least one outflow opening of the gas generator and the throttle element. As an alternative, the filter element and/or cooling element may also be arranged within the combustion chamber, to be precise preferably immediately in front of the combustion chamber outlet.

A vehicle seat 10 with a backrest 20 and a seat surface 30 can be seen in FIG. 1. A vehicle occupant, who is identified by the reference number 40, is on the vehicle seat 10.

The vehicle occupant 40 is held in the vehicle seat 10 by a seatbelt 50. For the sake of clarity, only the pelvic belt 55 of the seatbelt 40 is illustrated in FIG. 1.

In addition, FIG. 1 diagrammatically shows a gas generator 60 which is connected to a preferably gastight pelvic airbag integrated in the pelvic belt 55. The pelvic airbag cannot be seen in FIG. 1 since it is integrated in the pelvic belt 55. An integration of this type can be achieved, for example, by the pelvic belt 55 being of double-walled or tubular design and the pelvic airbag being placed in a folded up manner in the interior of the pelvic belt 55.

Figure 2:
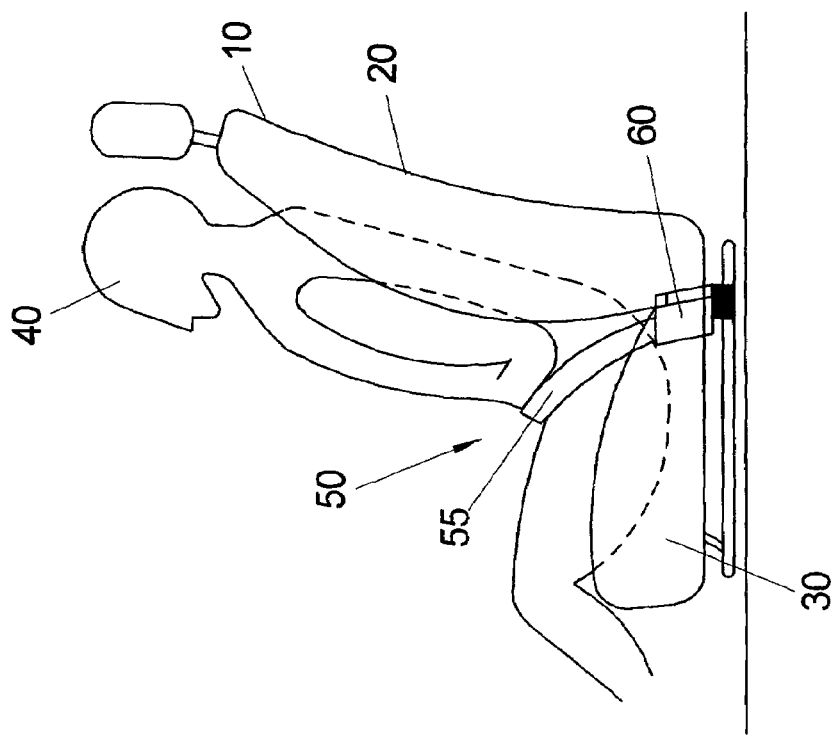
FIG. 2 shows the occupant protection device according to FIG. 1 after an accident has occurred.

In the case of a side crash or side impact which is established in a conventional manner by means of suitable sensors, the gas generator 60 will inflate the pelvic airbag integrated in the pelvic belt 55. This is illustrated in FIG. 2. The pelvic airbag 70 can be seen after the inflation.

The pelvic airbag 70 completely covers the pelvic region 80 of the vehicle occupant 40 and presses the vehicle occupant 40 in the direction of the vehicle interior. For this purpose, the pelvic airbag 70 is arranged on that side of the pelvis 80 of the vehicle occupant 10 which faces the outside of the vehicle. Therefore, as soon as the pelvic airbag 70 is inflated, the pelvis 80 of the vehicle occupant 40 is pressed in the direction of the vehicle interior, so that the abdomen and thorax region of the vehicle occupant 40 is moved away from the door paneling or body paneling (e.g. the B-pillar) intruding into the vehicle interior in the event of a side impact. The distance between the vehicle occupant 40 or the pelvic region 80 of the vehicle occupant 40 and the door or body paneling is therefore increased, so that the impact energy of the intruding vehicle body is reduced before it impacts against the vehicle occupant 40.

The pelvic airbag 70 is integrated, in the folded together state, in the pelvic belt 55 preferably so that it is deployed between the pelvic belt 55 and the pelvis 80 of the vehicle occupant 40. By means of the inflation in the region between the belt and vehicle occupant, a tensioning of the pelvic belt 55 or of the seatbelt 50 as a whole is additionally achieved, with the result that a dual protective effect is obtained: firstly, the vehicle occupant 40 is pressed into the vehicle interior, and, secondly, a tensioning of the seatbelt 50 is achieved.

In order to achieve an effective moving away of the vehicle occupant 40, the gas generator 60 produces a working pressure in the pelvic airbag 70 of at least 1.5 to 3 bar. Such a large working pressure is recommended in order to ensure that even heavy vehicle occupants are reliably pressed away from the dangerous region.

FIGS. 3, 4 and 5 show further exemplary embodiments for occupant protection devices according to embodiments of the invention.

In the case of the exemplary embodiment according to FIG. 3, the airbag 70 is fitted on the seat underframe 200 of the vehicle seat 10; in the case of the exemplary embodiment according to FIG. 4, the airbag 70 is fastened to the backrest frame 210 of the seat 10.

FIG. 5 shows an airbag 70 which is fastened in the region of the backrest pivot point 230 of the seat 10.

FIG. 6 shows an exemplary embodiment for the gas generator 60 of the occupant protection devices according to FIGS. 1 to 5.

A tubular combustion chamber 300 can be seen, wherein one tube end 310 includes an electrically ignitable igniter 320 is inserted in a gastight manner. The other tube end 315 of the tubular combustion chamber 300 is closed by a throttle disc 330 with a centrally arranged gas passage opening 340.

An outflow channel 360 in which a cooling element and/or filter element 370 is inserted adjoins that side 350 of the throttle disc 330 which faces away from the combustion chamber 300. The function of this cooling element and/or filter element 370 is to filter and cool the combustion gases formed in the combustion chamber 300 before they pass into the gas bag 70 to be filled.

The electrical release of the igniter 320 takes place by means of an electric voltage or an electric current which is applied to an electric interface 400 of the igniter 320. After ignition of the igniter 320, the igniting charge 410 of the igniter 320 virtually completely combusts in the combustion chamber 300; an escaping of the gases at the tube end 310 is prevented by the interface 400 of the igniter 320, which creates a gastight seal.

In the case of the exemplary embodiment according to FIG. 6, the cooling element and/or filter element 370 is arranged outside the combustion chamber 300; as an alternative, the cooling element and/or filter element 370 may also be situated within the combustion chamber 300, preferably immediately next to the throttle disc 330. Cooling elements and/or filter elements 370 may optionally be arranged both within the combustion chamber 300 and within the outflow channel 360.

As can be seen in FIG. 6, there is no additional propellant material; this means that only gas which is produced by the igniting charge 410 is used for filling the airbag 70. The combustion chamber 300 is accordingly otherwise "empty" or just filled with air under ambient pressure. The empty volume Vb of the empty space 450 of the combustion chamber 300 is larger than the installation volume Va of the igniting charge 410; the boundary surface between the installation volume Va of the igniting charge 410 and the empty space 450 is referred to in FIG. 6 with the reference number 460. Therefore, the following applies:

Vb>Va.

If, as already discussed, the cooling element and/or filter element 370 is arranged within the combustion chamber 300, then the remaining empty volume Vb' of the combustion chamber is preferably correspondingly dimensioned; therefore the following applies:

Vb'>Va.

FIG. 7 shows an edge section of the airbag 70 in detail. Two material layers 510 and 520 which are sewn to each other can be seen. In order to avoid an escaping of the gas through the seam regions 530, the latter are insulated in a gastight manner by means of a sealing material 540.

The two material layers 510 and 520 are composed, for example, in each case of a woven material 560 coated with silicone 550; the material layers 510 and 520 are therefore gastight.

The priority application, Germany Patent Application 10 2004 063 268.5, filed Dec. 24, 2004 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device for protecting a vehicle occupant in the event of a vehicle accident, comprising:
a gas generator including a combustion chamber, an igniter including an ignitable charge, and a throttle disk, wherein the combustion chamber does not contain any propellant material, and the combustion chamber extends from the ignitable charge to the throttle disk; and
an airbag connected to the gas generator and configured to be inflated by the gas generator in the event of an accident,
wherein only gas formed as a result of the igniting charge is used for filling the airbag,
wherein a volume of the combustion chamber is greater than the volume of the ignitable charge,
wherein the combustion chamber is tubular, wherein in one end of the tubular combustion chamber an electrically ignitable igniter is inserted in a gastight manner, and
wherein the other end of the tubular combustion chamber is closed by the throttle disk having a gas passage opening through which the gas leaves the combustion chamber.

2. The occupant protection device of claim 1, wherein the gas passage opening is centrally arranged in the throttle disk.

3. The occupant protection device of claim 1, wherein the combustion chamber includes a space where gas formed by the igniting charge collects before exiting the combustion chamber at a combustion chamber outlet.

4. The occupant protection device of claim 3, wherein the volume of the space is larger than the installation volume of the igniting charge.

5. The occupant protection device of claim 1, wherein the combustion chamber is empty prior to ignition of the ignitable charge.

6. An occupant protection device for protecting a vehicle occupant in the event of a vehicle accident, comprising:
a gas generator; and
an airbag connected to the gas generator and configured to be inflated by the gas generator in the event of an accident,
wherein the gas generator includes a throttle disk and a combustion chamber in which, in the event of an accident, a combustible material from an ignitable charge is combusted forming a gas which inflates the airbag, and the combustion chamber extends from the ignitable charge to the throttle disk,
wherein the combustion chamber includes a space in which the gas formed by the combustible material collects before leaving the combustion chamber at a combustion chamber outlet,
wherein the volume of the space is larger than the volume of the combustible material, and
wherein the combustion chamber is tubular, wherein in one end of the tubular combustion chamber an electrically ignitable igniter is inserted in a gastight manner, and
wherein the other end of the tubular combustion chamber is closed by the throttle disk having a gas passage opening through which the gas leaves the combustion chamber.

7. The occupant protection device of claim 6, wherein the combustible material is formed exclusively by an electrically ignitable igniting charge including material of an electrically ignitable igniter.

8. The occupant protection device of claim 6, wherein the combustion chamber outlet includes a throttle disc with at least one through-hole.

9. The occupant protection device of claim 6, wherein the airbag is fastened in an outer wall region of the vehicle in a motor vehicle door or a vehicle pillar.

10. The occupant protection device of claim 6, wherein the airbag is fastened in a region of a vehicle seat.

11. The occupant protection device of claim 10, wherein the airbag is fastened to a seat under frame of the vehicle seat.

12. The occupant protection device of claim 10, wherein the airbag is fastened to a backrest frame of the vehicle seat.

13. The occupant protection device of claim 10, wherein the airbag is fastened to a backrest pivot point of the vehicle seat.

14. The occupant protection device of claim 10, wherein the airbag is fastened in or to a covering part of the vehicle seat.

15. The occupant protection device of claim 6, wherein the airbag is fastened in or to a belt end fitting of a seatbelt of a vehicle.

16. The occupant protection device of claim 6, wherein the airbag is fastened in or to a seatbelt of the occupant protection device.

17. The occupant protection device of claim 16, wherein the seatbelt is of a double-walled or tubular design.

18. The occupant protection device of claim 17, wherein the airbag is placed in the interior of the double-walled or tubular seatbelt.

19. The occupant protection device of claim 16, wherein the airbag is fitted on the outside of the seatbelt, the airbag being guided by one or more loops of the seatbelt during the inflation.

20. The occupant protection device of claim 6, wherein the gas generator is configured so that the airbag is inflated to a pressure of at least 1.5 bar.

21. The occupant protection device of claim 20, wherein the airbag is inflated to a pressure of at least 3 bar.

22. The occupant protection device of claim 6, wherein the airbag is deployed between a seatbelt and the outside of a vehicle.

23. The occupant protection device of claim 6, wherein a woven fabric of a seatbelt is elastic and the airbag is integrated in the seatbelt so that the airbag concentrically widens or concentrically inflates the woven fabric of the seatbelt in the event of an accident.

24. The occupant protection device of claim 23, wherein the airbag is integrated exclusively in a region of the seatbelt located adjacent the vehicle occupant's pelvic region which faces the outside of the vehicle.

25. The occupant protection device of claim 6, wherein the airbag does not include an outflow opening.

26. The occupant protection device of claim 25, wherein the airbag substantially gastight.

27. The occupant protection device of claim 25, wherein a region of gas bag seams of the airbag includes sealing material.

28. The occupant protection device of claim 6, wherein the airbag includes a silicone-coated woven material.

29. The occupant protection device of claim 6, wherein the airbag is accommodated in a module housing comprising metal or plastic.

30. The occupant protection device of claim 6, wherein a filter element and/or a cooling element is arranged between at least one outflow opening of the gas generator and a throttle element.

31. The occupant protection device of claim 6, wherein a filter element and/or a cooling element is positioned in the combustion chamber adjacent a throttle element.

32. An occupant protection device for protecting a vehicle occupant in the event of a vehicle accident, comprising:

a gas generator including a tubular combustion chamber with first and second tube ends, the first tube end includes an igniter including an ignitable charge placed in a gastight manner and the second tube end includes a throttle disk, wherein the combustion chamber extends between the igniter and the throttle disk; and an airbag connected to the gas generator and inflated by the gas generator in the event of an accident, wherein a space between the igniter and the throttle disk is filled exclusively with gas or air, wherein a volume of the combustion chamber is greater than a volume of the ignitable charge, and wherein the throttle disk includes a gas passage opening through which gas leaves the combustion chamber.

33. An occupant protection device for protecting a vehicle occupant in the event of a vehicle accident, comprising:

a gas generator including a tubular combustion chamber with first and second tube ends, the first tube end includes an igniter including an ignitable charge placed in a gastight manner and the second tube end includes a throttle disk, wherein the combustion chamber extends between the igniter and the throttle disk; and an airbag connected to the gas generator and inflated by the gas generator in the event of an accident, wherein a space between the igniter and the throttle disk is filled exclusively with gas or air and wherein the gas generator includes at least one cooling element and/or filter element located on an opposite side of the throttle element from the ignitable charge, wherein a volume of the combustion chamber is greater than a volume of the ignitable charge, and wherein the throttle disk includes a gas passage opening through which gas leaves the combustion chamber.

34. A gas generator for inflating an airbag, the gas generator comprising:

a tubular combustion chamber with first and second tube ends, the first tube end includes an initiated ignitable charge placed in a gastight manner and the second tube end includes a throttle element, and the combustion chamber extends from the ignitable charge to the throttle element; and wherein a space between the ignitable charge and the throttle element is filled exclusively with gas or air and wherein the gas generator includes at least one cooling element and/or filter element located on an opposite side of the throttle element from the ignitable charge, wherein a volume of the combustion chamber is greater than the volume of the ignitable charge.

* * * * *

UNITED STATES PATENT AND TRADEMARK OFFICE
CERTIFICATE OF CORRECTION

PATENT NO. : 7,584,992 B2
APPLICATION NO. : 11/311125
DATED : September 8, 2009
INVENTOR(S) : Riedel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Fourteenth Day of September, 2010

David J. Kappos
*Director of the United States Patent and Trademark Office*